May 29, 1956  T. MASANO  2,747,929
PNEUMATIC CONVERTIBLE TOP FOR AUTOMOBILES
Filed May 4, 1953  2 Sheets-Sheet 1

INVENTOR.
THOMAS MASANO
BY
William J. Ruano
ATTORNEY

May 29, 1956 T. MASANO 2,747,929
PNEUMATIC CONVERTIBLE TOP FOR AUTOMOBILES
Filed May 4, 1953 2 Sheets-Sheet 2

INVENTOR.
THOMAS MASANO
BY
William J. Ruano
ATTORNEY

United States Patent Office 2,747,929
Patented May 29, 1956

2,747,929

PNEUMATIC CONVERTIBLE TOP FOR AUTOMOBILES

Thomas Masano, Reading, Pa.

Application May 4, 1953, Serial No. 352,629

3 Claims. (Cl. 296—117)

This invention relates to a convertible top for passenger automobiles and the like, and more particularly to a convertible top which can be inflated by air under pressure and, when deflated, may be collapsed toward the rear end of the vehicle.

It is known in the art to provide automobiles with pneumatic convertible tops which are inflated by introducing air under pressure in an air tight bag forming the top of the vehicle. However, such tops have the outstanding disadvantage of ballooning as the result of inflation with air, whereby the longitudinal central portion of the top is of considerably greater height than the side portions, thus greatly detracting from the appearance of the top and making it unwieldly, thus accounting for the lack of commercial adoption of inflatable tops. Another reason such tops have not met with favor has been their cumbersome construction and the requirement for complicated means, such as mechanical linkages operated by motors, hydraulic cylinders and the like, which add considerably to the cost of the assembly.

An object of my invention is to provide a novel inflatable top for a convertible automobile and the like, which top is devoid of the above named disadvantages.

A still further object of my invention is to provide a pneumatic top for convertible automobiles and the like, which top is devoid of ballooning and which, instead, presents a very pleasing and attractive appearance.

A more specific object of my invention is to provide a pneumatic convertible top provided with a plurality of air cells running either longitudinally or transversely for maintaining the upper and lower sections of the top at a substantially uniform distance apart throughout substantially the entire top area.

A further object of my invention is to provide an inflatable top for automobile convertibles, which top is of relatively simple construction and which can be demounted or collapsed by operating means of extremely simple construction, therefore providing a very inexpensive assembly for easily and quickly mounting or demounting the top.

Other objects and advantages of my invention will become apparent from a study of the following description taken with the accompanying drawings wherein.

Figure 1:
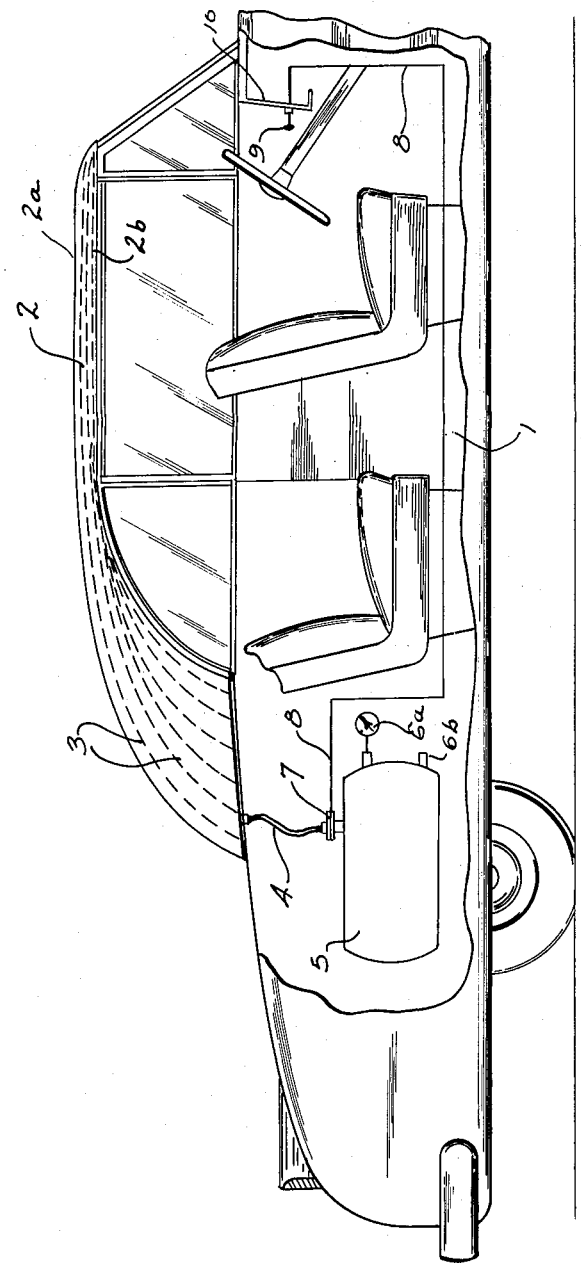
Figure 1 is a fragmentary, longitudinal view of an automobile shown partly broken away and partly schematic, and having a pneumatic convertible top embodying the principles of my invention.

Referring more particularly to Figure 1, numeral 1 denotes a passenger automobile or other vehicle having a convertible top, that is, provided with a top 2 which can be removed and collapsed toward the rear of the car during good weather. The top 2, in accordance with the present invention, is made in the form of an air tight bag having an upper layer or section 2a and a lower section or layer 2b, the marginal edges of which are secured together in an air tight manner to form an inflatable bag or enclosure. The top or bag 2 may be made of any suitable air-tight material, such as rubber coated nylon or Vinylite plastic or other fabrics or rubber-like materials that are impervious to air. The upper and lower sections 2a and 2b are held together by vertical strips or spacing elements 3 which are vulcanized or otherwise integrally secured to the upper and lower sections and extending along both sides of the car or roof, longitudinally of the car and spaced about two inches or so apart as shown more clearly in Figure 2. Such vertical longitudinal strips 3 subdivide the bag forming the top into pockets or cells which permit the stretching of the fabric in a longitudinal direction, the strips being made of substantially the same width or height to keep the thickness of the top 2 substantially uniform through a greater part of the area. Transversely extending strips 11, 12 and 13, extending across the entire width, may be provided at the rear, central and forward portions of the top to permit stretching of the top in also a transverse direction. Thus the vertical strips 3 will prevent the tendency of the top to balloon or become considerably greater in height at the center such as would occur without the strips 3. Of course, the strips 3 may be slightly higher at the central portion to avoid a perfectly flat top surface.

The top 2 may be inflated by means of an air hose 4 which is connected to an air tank 5 which stores air under pressure which can be measured by air gage 6a and into which air may be introduced through an air inlet valve 6b. Air under pressure may be obtained either from an outside source, such as air tanks or cylinders, or from a tank pressured by a pump operated by the engine. Between tank 5 and hose 4 there is provided a slide valve 7 of the type which is closed when moved to a central position. Valve 7 may be opened by pulling wire 8 which is led under the floor and terminates in a knob 9 mounted on the dash board 10. Pulling of knob 9 causes forward movement of wire 8 and opening of valve 7 to allow air under pressure from tank 5 to inflate the top 2. When it is desired to deflate top 2, knob 9 is pushed in, therefore allowing air in top 2 to be released into the atmosphere through valve 7 which at the same time keeps tank 5 closed to hose 4.

Figure 3:
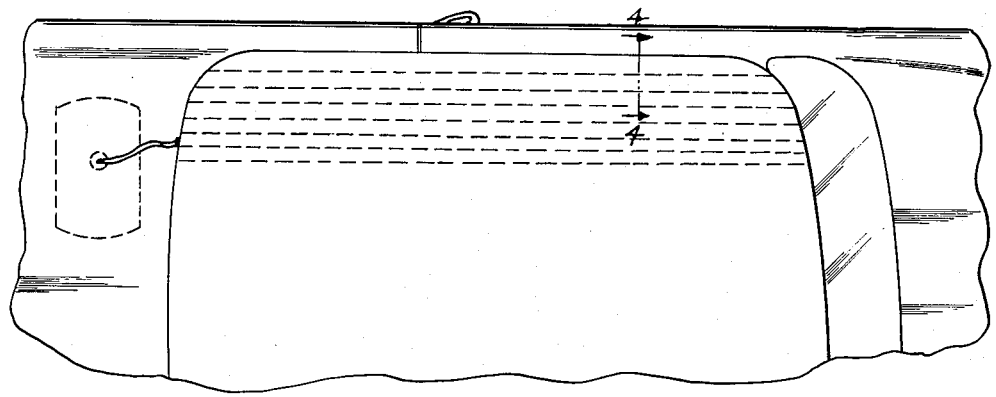
Figure 3 is a fragmentary top view showing a modification of the air cell arrangement shown in Figure 2.

A modification of the cell structure of the top is shown in Figure 3 wherein longitudinally extending strips 3 along only the side portions are shown, but which may, if desired, extend along the entire width of the top 2.

Figure 2:
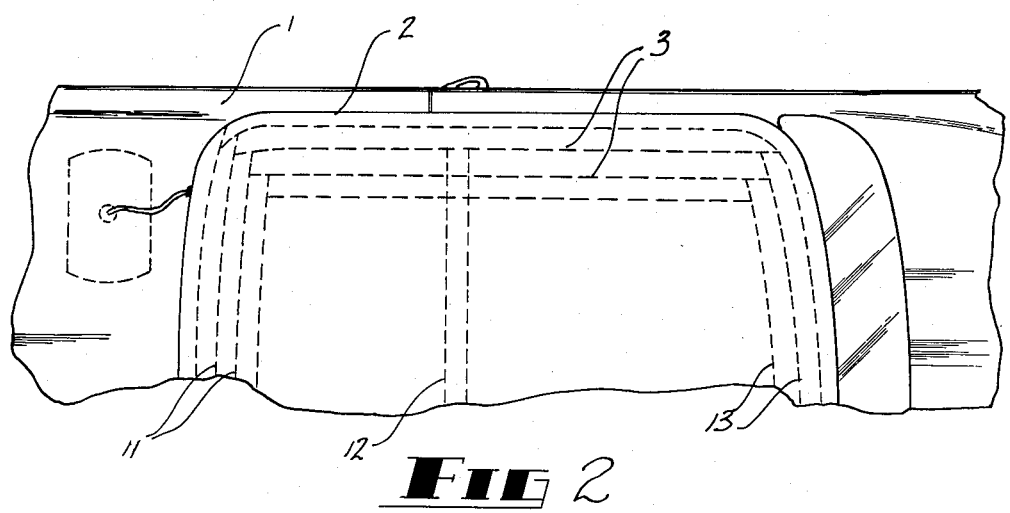
Figure 2 is a fragmentary top view showing one arrangement of air cells in the inflatable top shown in Figure 1.

An alternative arrangement would be to have only transverse strips such as 11, 12 and 13 of Figure 2 extend throughout a substantial part or the entire length of the top. Of course the cells, whether longitudinal or transverse, or both, may be non-uniformly spaced throughout a substantial area of the top.

Instead of strips 3 other suitable spacing elements may be used instead, as a plurality of vertical strips or wires at spaced intervals. Top 2 may be of transparent, ultra violet transmitting plastic.

The forward end of top 2 may be sealed and fastened to the top of the windshield by latches, clips or any other suitable types of fastening means which are known in the art. The rear end of top 2 is permanently fastened to the car by clips or other suitable fastening means, such as, perhaps, a zipper extending horizontally throughout the entire width of the rear portion.

Figure 4:
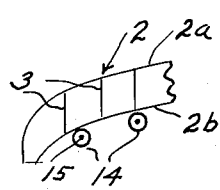
Figure 4 is an enlarged vertical cross-sectional view taken along line 4—4 of Figure 3.

Figure 4 shows a simple and effective operating means for collapsing or folding the top toward the rear of the automobile after deflation of the top. As shown in Figure 4 the rings or looped elements 14 are fastened underneath the lower section 2b, along spaced parallel rows. Through each row of rings 14 there extends an elastic band, such as 15, of rubber or other suitable elastic material, the rear ends of which are fastened to the rear end of the car, and the forward ends of which are fastened to the forward end portion of the top 2. Therefore, upon deflation of the top 2, the elastic bands 15 which were in stretched condition as a consequence of previous inflation of the top will now retract and in so doing will collapse the top 2 onto the rear portion of the automobile. Of course, when it is desired to mount the top 2, its forward part is pulled forwardly thereby tensioning elastic bands 15 as the forward part of top 2 is fastened to the top of the windshield. Air under pressure is then introduced into the top 2 through hose 4 as described hereinabove. Inflation of the top will assure a perfectly air tight seal at the joints above the windshield and along the sides of the car. Thus, irregularities of the joint forming parts of the car will be compensated for by the conforming tendency of the inflated top.

Thus it will be seen that I have provided an efficient, inflatable top for automobile convertibles and similar vehicles, which top is compartmented so as to avoid ballooning and so as to provide a tailored top of substantially uniform height throughout substantially the entire width thereof which provides a very attractive appearance; furthermore I have provided a pneumatic convertible top including very simple and inexpensive operating means for mounting, or for collapsing the top towards the rear of the car when deflated, and which eliminates the necessity of complicated and expensive linkages, operated by motors, hydraulic motors and the like, such as are prevalent in convertible top automobiles; furthermore I have provided a pneumatic convertible top which will provide an air envelope of substantially uniform thickness for uniformly insulating the top from hot or cold air outside as well as providing a top of the shape of conventional steel top cars, that is, curved with only a slight increase in height at the center.

While I have illustrated and described certain specific embodiments of my invention, it will be understood that these are by way of illustration only, and that various changes and modifications may be made within the contemplation of my invention and within the scope of the following claims.

I claim:

1. A convertible top for automobiles or the like, comprising an inflatable roof formed of an upper layer and a lower layer sealed together to form an inflatable bag, said layers being of air-impervious and flexible material, a plurality of strips adapted to extend vertically and longitudinally in spaced rows in said top and being progressively staggered in a downward direction adjacent the side portions of hte top to impart curvature thereto, the upper portions of said strips being fastened to said top layer and the lower sections thereof fastened to said lower layer so as to limit the extent of separation of said layers as a consequence of inflation by the introduction of air under pressure in said top and so as to provide the top with a substantially convex shape, spaced looped elements attached to said bottom section and arranged in longitudinal parallel rows, and tensioning bands extending through said elements to effect longitudinal collapsing of said top when deflated.

2. A convertible top for automobiles or the like, comprising a bag-like inflatable, substantially convex roof having top and bottom sections, vertically staggered spacer elements contained therein and connected to said top and bottom sections of said roof for keeping them at a predetermined distance apart and for imparting curvature to the roof upon inflation of the roof with air under pressure and a plurality of spaced, parallel, longitudinally extending rows of looped elements secured underneath said bottom section, a plurality of longitudinally extending elastic bands arranged in rows and extending through said rows of looped elements, the forward ends of said bands being fastened to the forward end portion of said top, and the rear ends of said bands being anchored to the rear portion of said top, whereby the top, when deflated, will collapse as a consequence of retraction of said elastic bands.

3. A convertible top for automobiles or the like comprising a bag of substantially air impervious and flexible material, said bag including top and bottom sections tied together by vertically extending strips disposed in longitudinal parallel rows and arranged in vertically staggered relationship in a manner so as to provide a substantially convex shape to the top in a longitudinal and lateral direction, a plurality of spaced rings attached to the bottom of said bottom section along spaced parallel longitudinal rows, elastic bands extending along said rows through said rings and having their forward ends anchored to the forward end of said top and the rearward ends anchored at the rear portion of the top so that as the result of tension of said bands said top, when deflated, will collapse in a longitudinal direction, and a compressed air tank including valve means for controlling flow of compressed air into said top for inflation thereof.

References Cited in the file of this patent

UNITED STATES PATENTS

| | | |
|---|---|---|
| 38,601 | Rankin | May 19, 1863 |
| 1,150,811 | Cooke | Aug. 17, 1915 |
| 1,603,465 | Hopkinson | Oct. 19, 1926 |
| 1,722,250 | McKee | July 23, 1929 |
| 2,045,344 | Deutsch et al. | June 23, 1936 |
| 2,064,128 | Smithers et al. | Dec. 15, 1936 |
| 2,448,054 | Seckel | Aug. 31, 1948 |